(12) United States Patent
Sigal et al.

(10) Patent No.: US 12,547,483 B2
(45) Date of Patent: Feb. 10, 2026

(54) AUTOMATICALLY GENERATING A TRANSLATION ENGINE FOR FACILITATING REMOTE PROCEDURE CALLS BETWEEN A CLIENT PROGRAM AND A SERVER PROGRAM

(71) Applicant: RED HAT, INC., Raleigh, NC (US)

(72) Inventors: Ronald Sigal, Highland, NY (US); Alessio Soldano, Gallarate (IT)

(73) Assignee: Red Hat, Inc., Raleigh, NC (US)

(*) Notice: Subject to any disclaimer, the term of this patent is extended or adjusted under 35 U.S.C. 154(b) by 759 days.

(21) Appl. No.: 17/939,274

(22) Filed: Sep. 7, 2022

(65) Prior Publication Data

US 2024/0078148 A1  Mar. 7, 2024

(51) Int. Cl.
  *G06F 9/54* (2006.01)
  *G06F 9/455* (2018.01)
  *G06F 9/50* (2006.01)

(52) U.S. Cl.
  CPC ............ *G06F 9/547* (2013.01); *G06F 9/4552* (2013.01); *G06F 9/5072* (2013.01); *G06F 9/54* (2013.01)

(58) Field of Classification Search
  CPC .............. G06F 9/547; G06F 9/541; G06F 9/54
  See application file for complete search history.

(56) References Cited

U.S. PATENT DOCUMENTS

| | | | |
|---|---|---|---|
| 6,446,137 B1 * | 9/2002 | Vasudevan | G06F 9/547 719/330 |
| 10,140,100 B2 | 11/2018 | Barnes et al. | |
| 10,732,944 B1 | 8/2020 | Feng et al. | |
| 11,182,379 B2 | 11/2021 | Yang | |
| 2005/0229189 A1 * | 10/2005 | McManus | G06F 8/00 719/330 |
| 2008/0196004 A1 * | 8/2008 | Choi | G06F 8/36 717/107 |

(Continued)

FOREIGN PATENT DOCUMENTS

| | | |
|---|---|---|
| CN | 109462504 A | 3/2019 |
| CN | 113934554 A | 1/2022 |
| WO | 2021136358 A1 | 7/2021 |

OTHER PUBLICATIONS

Aksakalli, et al., "A Model-Driven Architecture for Automated Deployment of Microservices," Applied Sciences 2021, Oct. 15, 2021; pp. 1-11.

(Continued)

*Primary Examiner* — Brian W Wathen
(74) *Attorney, Agent, or Firm* — Kilpatrick Townsend & Stockton LLP

(57) ABSTRACT

One example of the present disclosure includes a system that can access a server stub defining a server stub program. The server stub program can be configured to operate as a remote procedure call (RPC) interface for receiving a RPC request from a client program. The RPC request can include a data object in a first format. The system can also generate translator code defining a translation engine. The translator code can be generated based on the server stub. The translation engine can convert the data object from the first format associated with the RPC interface into a second format compatible with a server program. The server program can be separate from the server stub program and the translation engine.

18 Claims, 5 Drawing Sheets

(56) References Cited

U.S. PATENT DOCUMENTS

| | | | |
|---|---|---|---|
| 2014/0096148 A1* | 4/2014 | Yakovenko | G06F 9/547 719/330 |
| 2016/0004579 A1* | 1/2016 | Im | G06F 9/547 719/330 |
| 2016/0070609 A1* | 3/2016 | Chippa | G06F 9/547 709/219 |
| 2020/0110584 A1* | 4/2020 | Irimescu | G06F 8/30 |
| 2020/0183657 A1* | 6/2020 | On | G06F 8/311 |
| 2021/0329100 A1 | 10/2021 | Knight et al. | |

OTHER PUBLICATIONS

Stefanic, Michal, "Developing the Guidelines for Migration from RESTful Microservices to gRPC," Masaryk University, 2021; pp. 1-89.

* cited by examiner

AUTOMATICALLY GENERATING A TRANSLATION ENGINE FOR FACILITATING REMOTE PROCEDURE CALLS BETWEEN A CLIENT PROGRAM AND A SERVER PROGRAM

TECHNICAL FIELD

The present disclosure relates generally to remote procedure calls on computer systems. More specifically, but not by way of limitation, this disclosure relates to automatically generating a translation engine configured for facilitating remote procedure calls between a client program and a server program.

BACKGROUND

It has become increasingly common to deploy software services in distributed computing environments, such as cloud computing environments and computing clusters. Examples of such software services can include microservices, applications, and serverless functions. Once deployed, the software services can interact with one another to perform various functions.

One way in which clients may interact with the software services can involve using remote procedure calls. A remote procedure call (RPC) can allow a client program to call a procedure (e.g., a subroutine or service) in a different address space than that of the client program. Remote procedure calls can be implemented using a RPC protocol that enables a client program to call remote procedures on different machines as if the procedures were local. For example, a client program can call a remote procedure on a server as if the remote procedure was local to the client program. To effectuate this call, the client can transmit a request message in accordance with an RPC protocol to a server program, where the request message specifies the procedure and corresponding parameters. A server program can be any suitable software service executing on the server side. In response to receiving the request message, the server program can execute the procedure and transmit a response with the procedure's results to the client program, which may then resume execution.

There are several RPC frameworks designed to facilitate remote procedure calls between a client program and a server program. One popular RPC framework is gRPC, which is an open-source framework by Google®. gRPC makes use of protocol buffers (protobuf) to serialize structured data for communication over a network. Using protocol buffers, data can be easily serialized and transmitted over a network to effectuate a remote procedure call.

DETAILED DESCRIPTION

Figure 1:
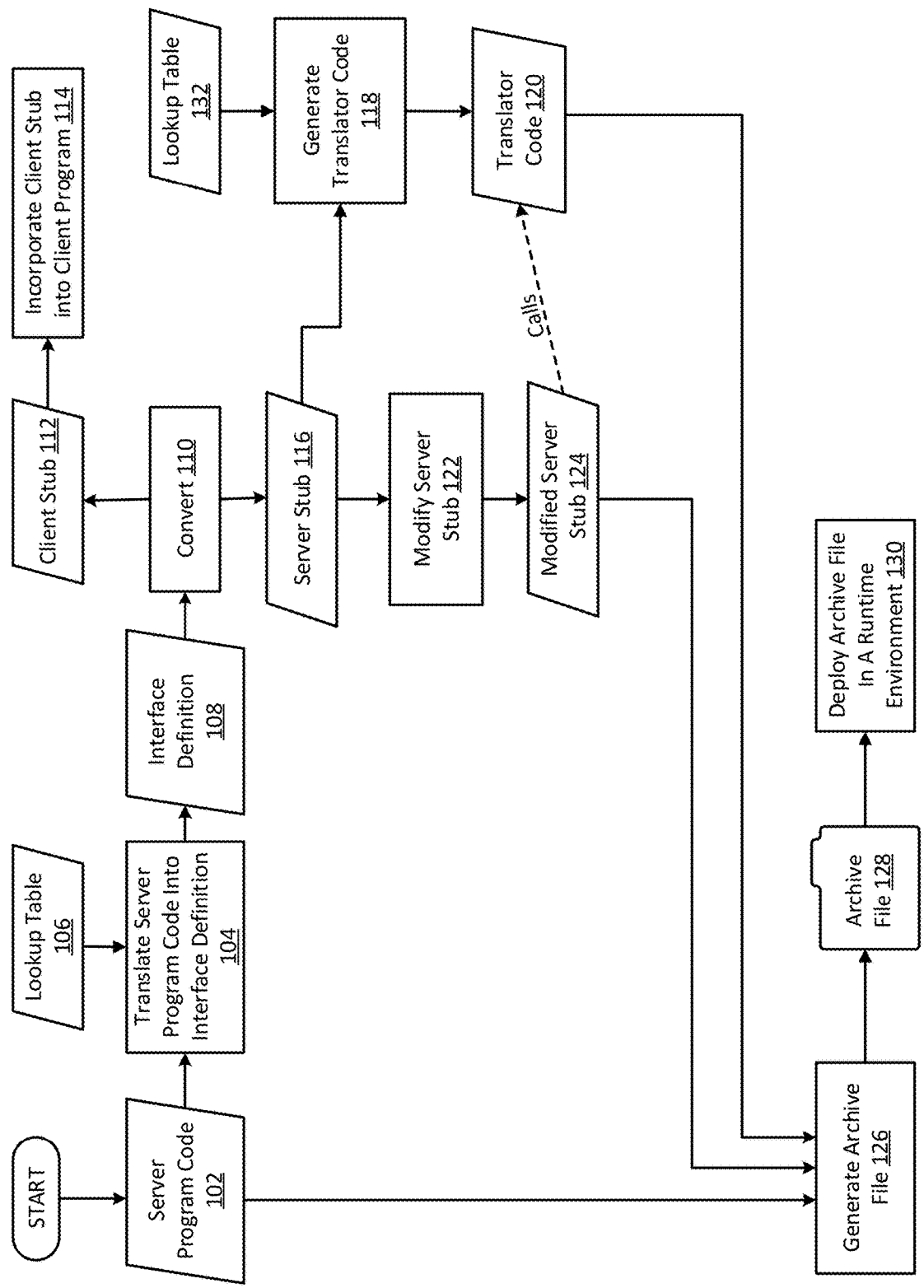
FIG. 1 shows an example of a process for generating a client stub, a modified server stub, and translator code according to some aspects of the present disclosure.

RPC frameworks can facilitate remote procedure calls (RPCs) between client programs and server programs. A client program can be a program executing on a client device and a server program can be a program executing on a server device. Some RPC frameworks, such as gRPC, can employ an interface definition language (IDL) to easily define RPC functionality. An interface definition language can be a descriptive language used to define data types and interfaces in a way that is independent of any particular programming language and operating platform. An interface definition language may specify a particular syntax for use in defining the data types and interfaces. Using the interface definition language, a human developer can draft an interface definition for implementing their desired RPC functionality.

In some cases, a developer can execute an IDL compiler to automatically convert an interface definition into a client stub and a server stub. An example of such an IDL compiler in the context of gRPC can be protoc, which can convert a "*.proto" file containing an interface definition into a client stub and a server stub, where the client stub and the server stub are both designed for use with the gRPC protocol. The client stub and the server stub may be written in the same or different programming languages, such as C++ and Java. A client stub can be source code configured for converting (e.g., marshalling) parameters used in a procedure call and de-converting (e.g., de-marshalling) results passed from the server program after executing the procedure. A server stub can be source code configured for de-converting the parameters passed by the client program and converting the results from executing the procedure. After the client stub and the server stub have been generated, the developer can incorporate the client stub into the source code of the client program and the server stub into the source code of the server program. This can allow the two programs to cooperate with one another and thereby implement the desired RPC functionality. In this context, the server program operates as a gRPC server and the client program operates as a gRPC client.

While the above process may be suitable in situations where the client program and the server program operate according to the same RPC framework (e.g., gRPC), it may not work for situations where the server program uses a different RPC framework than the client program. For example, if the server program is a JAX-RS service, it may use different syntaxes or data types than a gRPC client and may therefore be incompatible with gRPC (and the server stub designed for gRPC). JAX-RS stands for Java API for RESTful Web Services, which is a Java based programming language API and specification to provide support for creating web services according to the Representational State Transfer architectural pattern. If a developer attempts to marry two different RPC frameworks together in this way, there can be interoperability issues that can lead to failures and incorrect RPC results.

Some examples of the present disclosure can overcome one or more of the abovementioned problems by using a translation engine that can bidirectionally translate between a server stub program and a server program. The server stub program can be an instance of the server stub, which can be designed to interface with a client program using a first RPC framework. The server program can be designed to use a second RPC framework that is different from the first RPC framework. The server stub program and the server program can execute separately from one another on the server side. Using the translation engine, the system can translate between the two RPC frameworks to help resolve interoperability problems.

As one example, a system can automatically generate the translation engine based on the server stub. After generating the translation engine, the system can deploy the server stub program, the server program, and the translation engine on the server side. The translation engine can act as an intermediary between the server stub program and the server program. The translation engine can allow the server stub program to bidirectionally interface with the server program, to help translate between the first RPC framework and the second RPC framework.

To facilitate the bidirectional communication, the server stub can be modified to incorporate calls to the translation engine at appropriate times. For example, a client program can transmit a data object to the server stub over a network, such as the Internet. The client program and the server stub may engage in network communications using protocol buffers. Rather than directly providing the data object to the server program, the server stub can call the translation engine to convert the data object from a first format, which may be incompatible with the server program, into a second format that is compatible with the server program. The first format may be incompatible with the server program if it is incompatible with the second RPC framework of the server program, and the second format may be compatible with the server program if it is compatible with the second RPC framework of the server program. The translation engine can then provide the data object in the second format to the server program, which can execute a procedure based on the data object and generate results. The server program can provide the results to the translation engine, which can convert the results from the second format into the first format and then provide them to the server stub program. The server stub program can then transmit the results over the network back to the client program. In this way, the translation engine can perform bidirectional translations that allow for interoperability between the server stub program and the server program.

In some examples, the system can use the source code to automatically generate the interface definition used to create the server stub. For example, the system can automatically parse and traverse through the source code (e.g., the classes and methods therein) for the server program to identify certain functionality, such as calls, their parameters, and their returns. The system can then automatically convert that functionality into an interface definition written in an IDL. In some examples, the system can perform the conversion using a predefined mapping, which can correlate code segments in the source code for the server program into IDL segments for the interface definition. An IDL segment can be a content segment written in the interface definition language for use in the interface definition. Automatically creating the interface definition in this way can significantly reduce development time and errors, while also tailoring the interface definition to the server program.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows an example of a process for generating a client stub, a modified server stub, and translator code according to some aspects of the present disclosure. Other examples may include more steps, different steps, or a different order of steps than is shown in FIG. 1.

The process begins with a computer system obtaining server program code 102. The computer system can include one or more computing devices, such as servers, desktop computers, laptop computers, tablets, etc. The server program code 102 is source code for a server program, which can be any suitable type of program configured to be executed by a server to assist in handling requests from a client device. The server program can be configured to operate using a first RPC framework. For example, the server program can be a JAX-RS service that is configured to operate using a JAX-RS based RPC framework. The source code can be written in any suitable language, such as Java, C++, or C. The computer system can obtain the server program code 102 from any suitable source, such as from a code repository like Github® or from a software developer.

The server program code 102 can include one or more code segments associated with a remote procedure call. For example, the server program code 102 can include a code segment that can be implemented in response to receiving a remote procedure call from a client device, such as a laptop computer, desktop computer, tablet, or mobile phone. One example of the server program code 102 is shown in Table 1 below:

TABLE 1

Example of Server Program Code

```
package org.patent;
import jakarta.ws.rs.POST;
import jakarta.ws.rs.Path;
public class Greeting {
    private String s;
    public Greeting(String s) {
        this.s = s;
    }
    public String toString( ) {
        return "hello " + s;
    }
}
@Path("")
public class Greeter {
    @POST
    @Path("greet/string")
    String m1(String name) {
        return "hello " + name;
    }
}
public class FancyGreeter extends Greeter {
    @POST
    @Path("greet/fancy")
    public Greeting m2(String s) {
        return new Greeting(s);
    }
}
```

In the above example, "Greeting" is a data object, "Greeter" is a JAX-RS service, and "FancyGreeter" is a subclass of Greeter which is also a JAX-RS service.

In block 104, the computer system automatically translates the server program code 102 into an interface definition 108. The interface definition 108 can be written in an interface definition language (IDL). In some examples, the computer system can perform this translation using a predefined lookup table 106 or predefined logic. For example, the computer system can access a lookup table 106 or execute predefined logic that correlates functionality in the server program code 102 (e.g., specific code segments of the server program code 102) to corresponding IDL segments. Each IDL segment may be a code segment written in an IDL language that represents the corresponding functionality in the server program code 102. The lookup table 106 or predefined logic may have been pre-generated by a software developer. The computer system can parse and traverse through the server program code 102, and use the lookup table 106 or predefined logic to map one or more functional aspects of the server program code 102 to corresponding IDL segments, to populate the interface definition 108. One example of an interface definition 108 automatically generated based on the server program code shown in Table 1 is shown below in Table 2:

TABLE 2

Example of an Interface Definition

...
service GreeterService {
// /greet/fancy gString org_patent___Greeting POST sync
    rpc m2 (GeneralEntityMessage) returns (GeneralReturnMessage);
// /greet/string gString gString POST sync
    rpc m1 (GeneralEntityMessage) returns (GeneralReturnMessage);
}
message org_patent___Greeting {
    string s = 1;
}
...
message GeneralEntityMessage {
    ServletInfo servletInfo = 34;
    string URL = 35;
    map<string, gHeader> headers = 36;
    repeated gCookie cookies = 37;
    oneof messageType {
        gString gString_field = 38;
        FormMap form_field = 39;
    }
}
message GeneralReturnMessage {
    map<string, gHeader> headers = 40;
    repeated gNewCookie cookies = 41;
    gInteger status = 42;
    oneof messageType {
        gString gString_field = 43;
        org_patent___Greeting org_patent___Greeting_field = 44;
    }
}

In the above example, a service named "GreeterService" has been introduced that includes remote procedure call (rpc) code. That rpc code is derived, for example using the lookup table 106 or predefined logic, from the methods in the Greeter and FancyGreeter classes of the server program code 102. During the conversion from the server program code 102 to the interface definition 108, the computer system may also include metadata to be used in later processing steps. In some examples, the metadata can be commented information that is incorporated into the content of the interface definition 108. One example of such commented information can include the commented lines around the rpc code in Table 2, where such commented information can convey parameters that are to be used in later steps. The interface definition 108 shown in Table 2 also includes data formats and message definitions. For example, the interface definition shown in Table 2 includes a protobuf type "org_patent_Greeting," which is translated from the data type "org.patent.Greeting" in the server program code 102. The GeneralEntityMessage and GeneralReturnMessage message types are general purpose data objects for conveying information to and from a client program, such as a gRPC client. In this example, there is a "oneof" field in GeneralReturnMessage. That field can hold either a gString object returned by Greeter.m1( ), or an org_patent_Greeting object returned by FancyGreeter.m2( ). The interface definition 108 may be stored in one or more files, such as a *.proto file in the context of gRPC.

After the interface definition 108 has been generated, the process can continue to block 110. At block 110, the computer system automatically converts the interface definition 108 into a client stub 112 for use with a client program and a server stub 116 for use with the server program. The client stub 112 and server stub 116 are each source code written in a programming language that is different from the IDL. For example, the client stub and the server stub may be written in C++, Java, Python, or any combination of these. To perform this conversion, in some examples the computer system can compile the interface definition 108 using protoc, which is a compiler associated with the gRPC framework. In the context of protoc, the term "compile" involves converting the interface definition 108 into client stubs and server stubs, which are still source code, rather than compiling the interface definition 108 into executable machine code. Protoc can automatically generate the client stubs and server stubs from an interface definition 108. Other types of compilers may alternatively be used to perform this conversion.

At the conclusion of the conversion process, the computer system may have generated a client stub 112 and a server stub 116 The client stub 112 and the server stub 116 may be written in the same programming language (e.g., Java) or different programming languages, where said programming languages are different from the interface definition language. The client stub 112 and the server stub 116 may be configured to interact with one another using the same RPC framework, which can be a second RPC framework that is different from the first RPC framework of the server program.

In generating the server stub 116, various methods from the interface definition 108 are converted into corresponding methods in the server stub 116. One example of such a translation can involve translating the method "rpc m1 (GeneralEntityMessage) returns (GeneralReturnMessage)" in the interface definition of Table 2 into the following method shown in Table 3.

TABLE 3

Example of A Server Stub Method public void m1 (org.patent.Greeter_proto.GeneralEntityMessage request,
io.grpc.stub.StreamObserver<org.patent.Greeter_proto.GeneralReturnMess
age> responseObserver) {
    io.grpc.stub.ClientCalls.asyncUnaryCall(getChannel( ) .newCall(getM1M
ethod( ), getCallOptions( ) ), request, responseObserver);
}

At block 114, the computer system incorporates the client stub 112 into a client program. For example, the computer system can employ class linking to incorporate the client stub 112 into the client program. Alternatively, the computer system can incorporate some or all of the code of the client stub 112 directly into the source code of the client program. Either way, the client program can be modified to incorporate the client stub 112. The client stub 112 can be configured to cooperate with the server stub 116 to implement the remote procedure call functionality.

At block 118, the computer system automatically generates translator code 120. In some examples, the computer system can generate the translator code 120 using a predefined lookup table 132 or predefined logic. For example, the computer system can access a lookup table 132 or predefined logic that correlates functionality in the server stub 116 (e.g., specific code segments of the server stub 116) to corresponding translation segments. A translation segment can be a segment of program code configured to perform a translation between the server stub 116 and the server program. For example, a translation segment can perform a translation between the first RPC framework of the server program and the second RPC framework of the server stub 116. The lookup table 132 or the predefined logic may have been pre-generated by a software developer. The computer system can parse and traverse through the server stub 116, and use the lookup table 132 to map one or more functional aspects of the server stub 116 to corresponding translation segments, to populate the translator code 120. For particular example, the computer system can determine that the server stub 116 involves a data type that is incompatible with the first RPC framework of the server program and use the lookup table 132 to identify a corresponding translation segment that is configured to convert the incompatible data type to a compatible data type (a data type that is compatible with the first RPC framework of the server program).

As one particular example, the computer system may identify the data type "org_patent_Greeting" in the server stub 116, determine that this needs to be translated back to the data type "org.patent.Greeting" associated with the original server program code 102, and use the lookup table 132 or predefined logic to select a translation segment to perform this translation. The computer system can then incorporate the translation segment into the translator code 120. In some examples, the translator code 120 may itself include a lookup table or predefined logic for translating between the server stub and the server program. For instance, the lookup table can map data types and functions associated with the server stub to data types and functions associated with the server program.

In some examples, the translator code 120 is configured to translate message classes back and forth between the classes (e.g., Java classes) used by the server program and the classes used by the server stub 116. The server program and the server stub 116 may use the different classes due to their different RPC frameworks. In the examples shown in Tables 1 and 3, the server stub 116 involves the message class org_patent_Greeting and the server program code 102 involves the message class org.patent.greeting, as well as standard classes like Integer and String. From this, two general methods can be created as shown in Table 4 below and, for each message type, a pair of classes can be generated that are tailored to the fields in the message as shown in Table 5.

TABLE 4

Examples of Methods In Translator Code public static Message translateToJavabuf(Object o) { ... }
public static Object translateFromJavabuf(Message message) { ... }

TABLE 5

Examples of Message Classes static class gInteger__ToJavabuf implements TranslateToJavabuf {
    private static Descriptor descriptor =
org.patent.Greeter__proto.gInteger.getDescriptor( );
    private static DynamicMessage.Builder builder =
DynamicMessage.newBuilder(descriptor);
    public Message assignToJavabuf(Object x) {
        Integer p = (Integer) x;
        org.patent.Greeter__proto.gInteger.Builder builder =
org.patent.Greeter__proto.gInteger.newBuilder( );
        return builder.setValue(p.intValue( ) ) .build( );
    }
}
static class gInteger__FromJavabuf implements TranslateFromJavabuf
{
    private static Descriptor descriptor =
org.patent.Greeter__proto.gInteger.getDescriptor( );
    public Integer assignFromJavabuf(Message message) {
        FieldDescriptor fd = descriptor.getFields( ) .get(0);
        return (Integer) message.getField(fd);
    }
    public void assignExistingFromJavabuf(Message message, Object
obj) { }
}

At block 122, the computer system can also modify the server stub 116 to generate a modified server stub 124. The modified server stub 124 is a modified version of the source code of the server stub 116. The computer system can modify the server stub 116 (to generate the modified server stub 124) by incorporating calls to and from the translator code 120 at appropriate places in the server stub 116. For example, the computer system can modify the server stub 116 to incorporate calls to the translator code 120 at locations associated with data types or functions that are incompatible with the server program. As one particular example, the computer system can incorporate a call to the translator code 120 when the server stub 116 receives an incompatible data type from the client program. The call may trigger the translator code 120 to translate the incompatible data type to a compatible data type, which the translator code 120 can then pass on to the server program. One example is shown below, in which the method m1( ) of Table 3 is overridden with the code shown in Table 6.

TABLE 6

Example of A Modified Method In the Modified Server Stub

@java.lang.Override
public void m1 (org.patent.Greeter__proto.GeneralEntityMessage
param, StreamObserver<org.patent.Greeter__proto.GeneralReturnMessage>

TABLE 6-continued

Example of A Modified Method In the Modified Server Stub

```
responseObserver) {
    HttpServletRequest request = null;
    try {
      HttpServletResponseImpl response = new
HttpServletResponseImpl("gString", "sync",
Greeter_Server.getContext( ), builder, fd); // Generate servlet
response
      GeneratedMessageV3 actualParam = param.getGStringField( );
      request = getHttpServletRequest (param, actualParam,
"//greet/string", response, "POST",
"org.patent.Greeter_proto.GeneralReturnMessage"); // Generate
servlet request
      associateCdiContext(request);
      HttpServletDispatcher servlet = getServlet( );
      servlet.service("POST", request, response); // Pass servlet
request and response into RESTEasy
      MockServletOutputStream msos = (MockServletOutputStream)
response.getOutputStream( );
        ByteArrayOutputStream baos = msos.getDelegate( );
        ByteArrayInputStream bais = new
ByteArrayInputStream(baos.toByteArray( ) );
        gString reply = gString.parseFrom(bais); // Retrieve
javabuf response value generated inside RESTEasy
        org.patent.Greeter_proto.GeneralReturnMessage.Builder grmb
= createGeneralReturnMessageBuilder(response);
        grmb.setGStringField(reply);
        responseObserver.onNext(grmb.build( ) ); // Pass
GeneralReturnMessage to gRPC runtime
    } catch (Exception e) {
      responseObserver.onError(e);
    } finally {
      responseObserver.onCompleted( );
      if (cdiContext != null) {
        cdiContext.dissociate(request);
      }
    }
  }
```

The above code can receive a gRPC request from a client program, translate the gRPC request into another type of request (e.g., a JAX-RS request) that is appropriate for the server program, and dispatch the other type of request to the server program. The above code can also translate a response from the server program back into a gRPC response and return the gRPC response to the client program. Similar techniques can be applied for client programs that use frameworks other than gRPC to transmit their RPC requests.

In some examples, the computer system can determine how to modify the server stub 116 based on an analysis of the server program code 102 to determine the data types and functions with which the server program is compatible. For example, the computer system can traverse and parse the server program code 102 to determine the variables, data types, and functions in the server program. Based on this information, the computer system can then determine which variables, data types, and functions in the server stub 116 are compatible with the server program (e.g., it's RPC framework) and are not compatible with the server program. Additionally or alternatively, a software developer may provide this compatibility information to the computer system (e.g., to inform the computer system of locations in which calls to the translator code 120 should be placed within the server stub 116).

At block 126, the computer system can generate an archive file based on the server program code 102, the modified server stub 124, the translator code 120, or any combination of these. For example, the computer system can generate an archive file that includes the server program code 102, the modified server stub 124, and the translator code 120. Additionally or alternatively, the computer system can generate an archive file that includes executable (e.g., compiled) versions of the server program code 102, the modified server stub 124, and the translator code 120. An executable version of the server program code 102 can be referred to herein as the server program. An executable version of the modified server stub 124 can be referred to herein as a server stub program. An executable version of the translator code 120 can be referred to herein as a translation engine. The archive file can have any suitable format. For example, the archive file may be a ZIP file, a TAR archive, or an image file usable to deploy containers or virtual machines.

In block 130, the computer system can deploy the archive file 128 in a runtime environment. The runtime environment may be part of the computer system or remote from the computer system. For example, the runtime environment may be a cloud computer system that is remote from the computer system that performed some or all of the operations described above. Deploying the archive file 128 in the runtime environment can involve deploying the contents of the archive file 128 in the runtime environment. For example, deploying the archive file 128 in the runtime environment can involve deploying the server program, server stub program, and translation engine in the runtime environment. In some examples, the computer system can employ one or more deployment engines, such as a container deployment engine like Docker® or a virtual-machine deployment engine like a hypervisor, to deploy the archive file 128 in the runtime environment. Once these programs have been deployed in the runtime environment, they can interact with one another as shown in FIG. 2.

Figure 2:
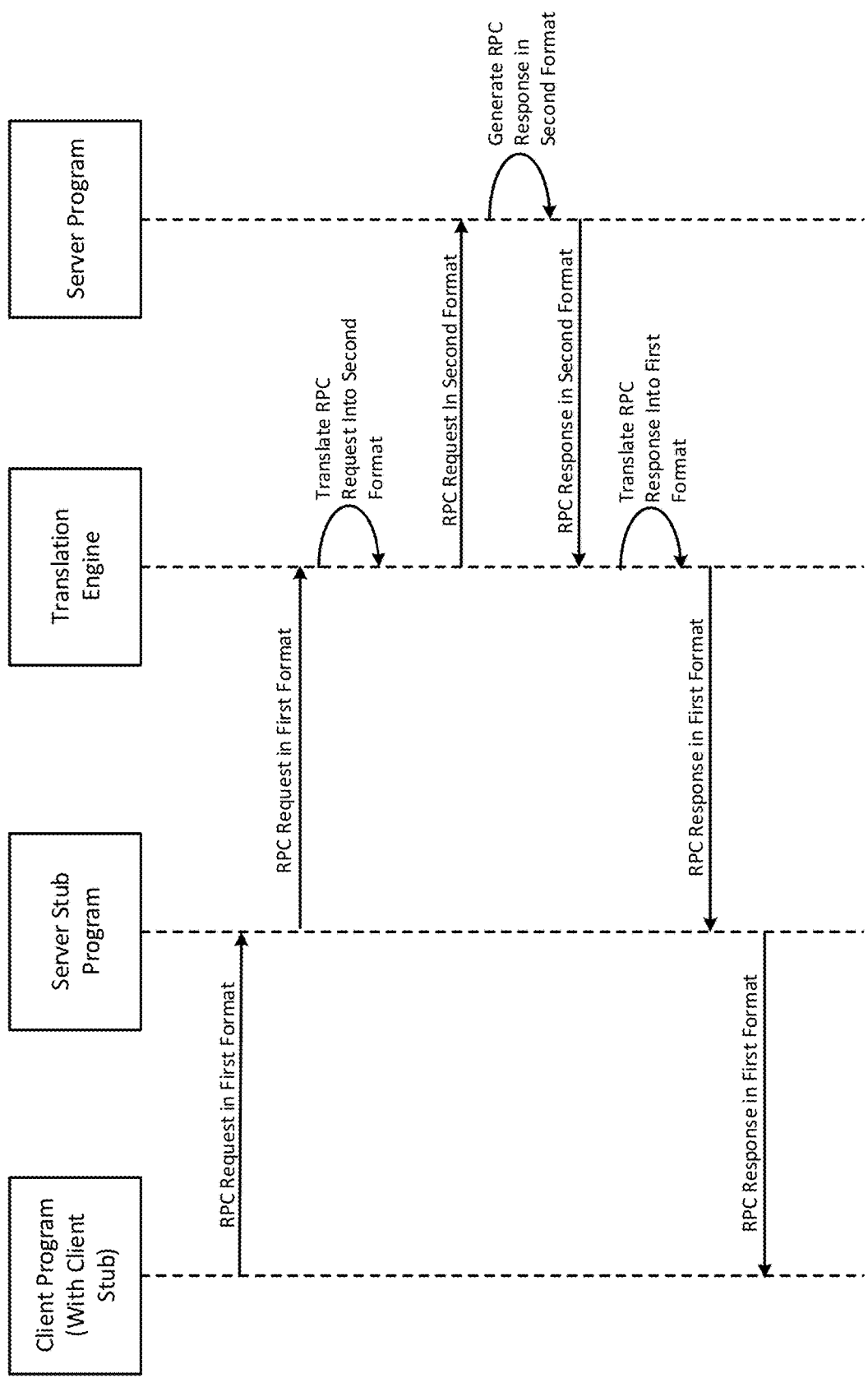
FIG. 2 shows an example of a sequence diagram involving translations between a server stub program and a server program according to some aspects of the present disclosure.

FIG. 2 shows an example of a sequence diagram for translating between a server stub program and a server program according to some aspects of the present disclosure. The sequence begins with the client program, which is executing on the client side, transmitting a RPC request in a first format to the server stub program. The first format may correspond to a first RPC framework. The client program can transmit the RPC request to the server stub program via one or more networks. The RPC request is a request associated with a remote procedure call.

The server stub program, which is executing on the server side, can receive the RPC request and forward it to the translation engine. The server stub program may forward the RPC request to the translation engine based on a call to the translation engine previously inserted into the server stub program (e.g., in block 122 of FIG. 1).

The translation engine can receive the RPC request in the first format, translate data of the RPC request into a second format, and forward the translated RPC request to the server program. The second format can correspond to a second RPC framework of the server program. The translation engine can rely on its internal logic and/or lookup table to perform this translation. The first format can be different from the second format. For example, the first format can be a first data type and the second format can be a second data type. The first format may be incompatible with the server program and the second format may be compatible with the server program. For example, the first format may generate an error in the server program or otherwise produce an undesirable result.

The server program can receive the translated RPC request and execute the corresponding procedure that was called. The server program can execute the procedure using the translated data in the translated RPC request. For example, the server program can execute the procedure using a data type "org.patent.Greeting" translated from a data type "org_patent_Greeting" in the original RPC request. Based on executing the procedure, the server program can generate results. The server program can provide the results to the translation engine in an RPC response. The RPC response may provide the results in the second format.

The translation engine can receive the RPC response in the second format and translate it to the first format. For example, the translation engine can translate the results from the second format to the first format. The translation engine can rely on its internal logic and/or lookup table to perform this translation. The translation engine can then provide the translated RPC response to the server stub program, which can forward it to the client program.

Figure 3:
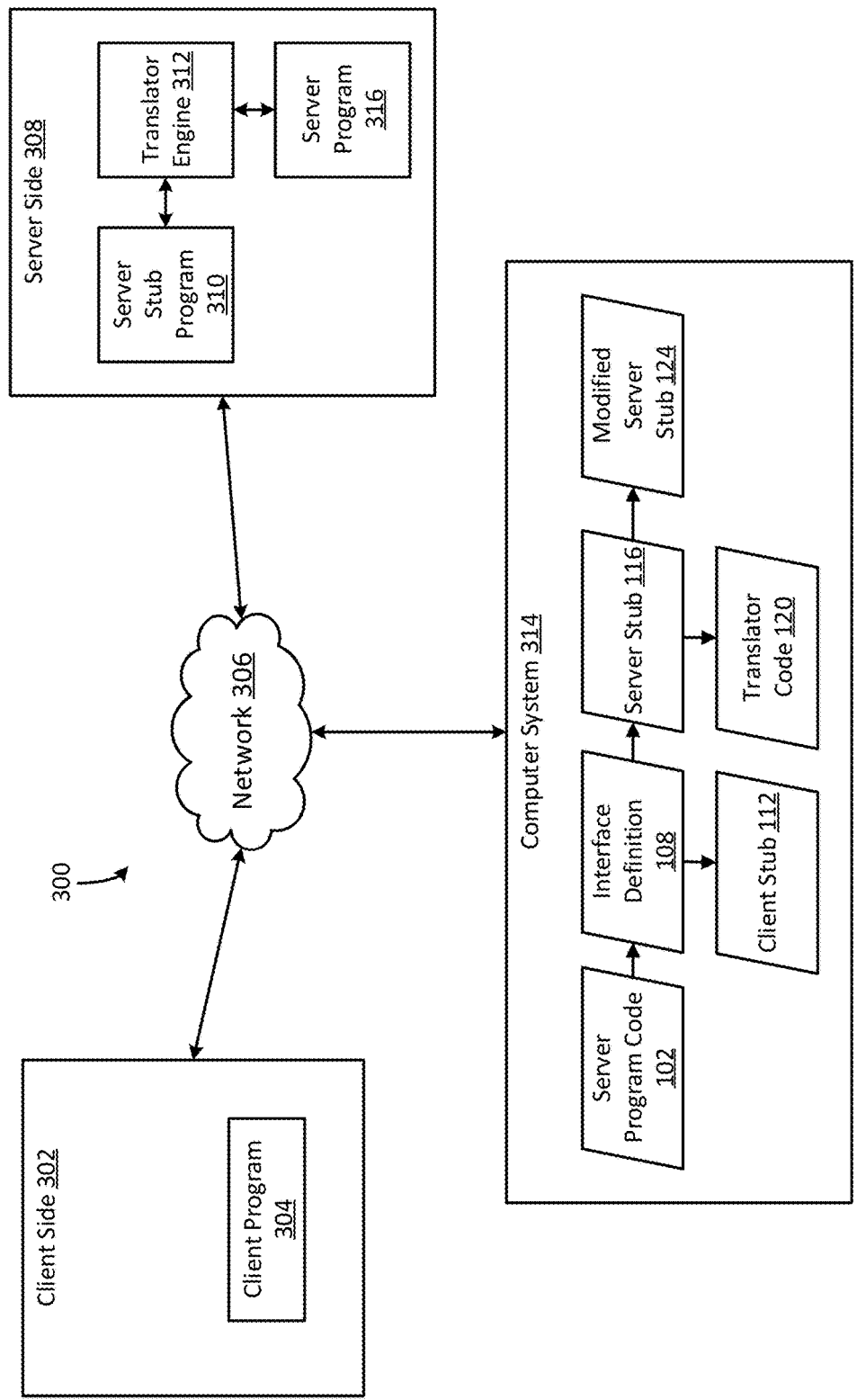
FIG. 3 shows a block diagram of an example of a system for implementing some aspects of the present disclosure.

FIG. 3 shows a block diagram of an example of a system 300 for implementing some aspects of the present disclosure. The system 300 includes a computer system 314, which can include one or more computing devices. Each computing device can include one or more processors and one or more memories. In some examples, the computer system 314 can be a distributed computing environment, such as a cloud computing environment, data grid, or computing cluster. The computer system 314 can implement some or all of the functionality described above to generate some or all of the interface definition 108, the server stub 116, the modified server stub 124, the translator code 120, and the client stub 112.

The system 300 can also include a client side 302 and a server side 308, which can interact with one another via one or more networks 306 (e.g., the Internet). The client side 302 can include one or more computing devices. In some examples, the client side 302 can be distributed computing environment with multiple networked nodes in communication with one another. The client side 302 can include one or more client programs, such as client program 304. The client program 304 may be configured with the client stub 112 for engaging in remote procedure calls to the server side 308.

The server side 308 can also include one or more computing devices. In some examples, the server side 308 can be distributed computing environment with multiple networked nodes in communication with one another. The modified server stub 124 can be deployed as a server stub program 310 on the server side 308. The translator code 120 can be deployed as a translation engine 312 on the server side 308. The server program code 102 can be deployed as a server program 316 on the server side 308. The translation engine 312 can interface with the server stub program 310 and the server program 316 to facilitate interactions between the server stub program 310 and the server program 316.

Although the computer system 314 is shown in FIG. 3 as being separate from the client side 302 and the server side 308, in other examples the computer system 314 can be part of the client side 302 or the server side 308. The arrangement of components shown in FIG. 3 is intended to be illustrative and non-limiting.

Figure 4:
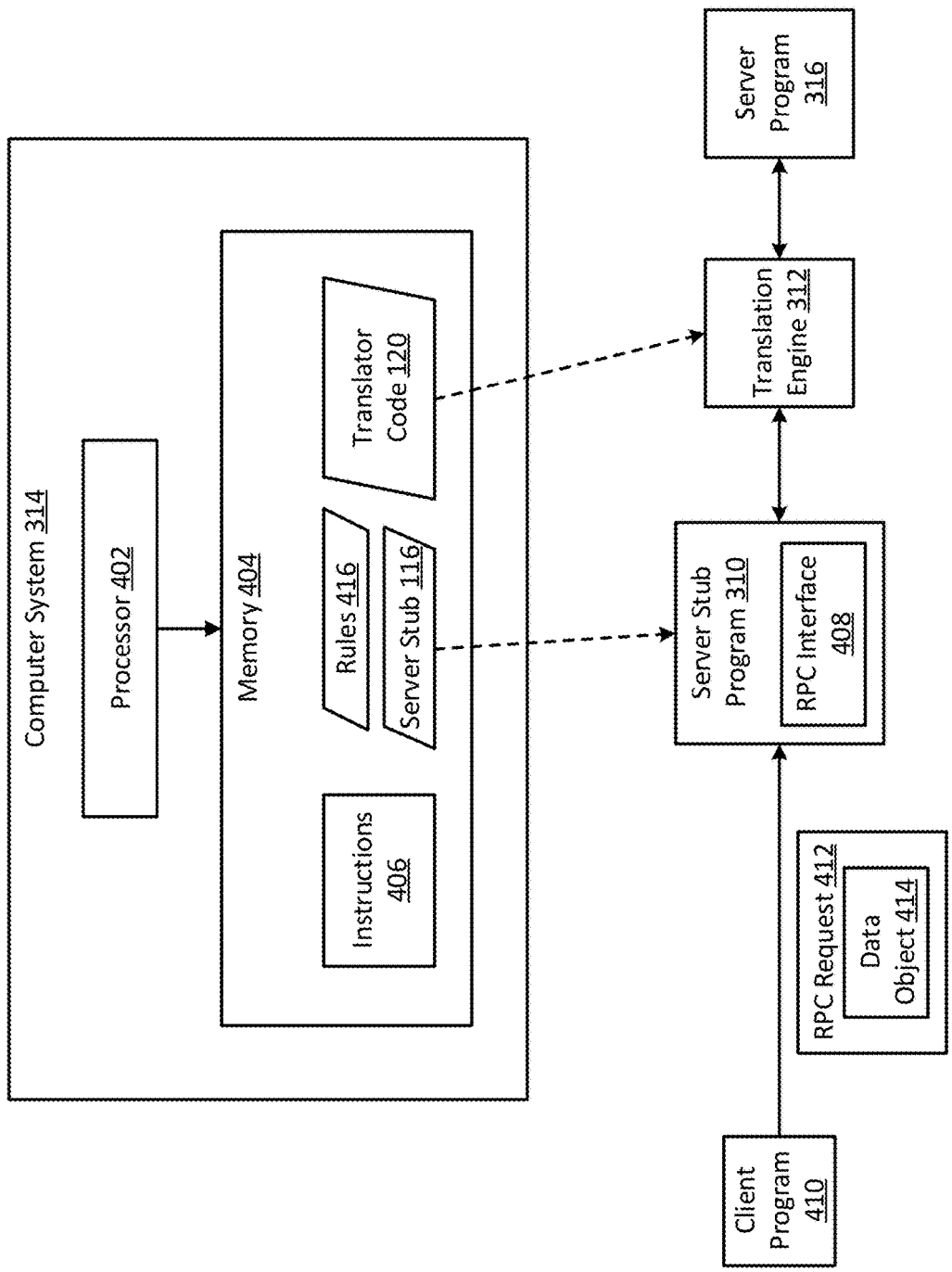
FIG. 4 shows a block diagram of an example of a computer system for generating translator code according to some aspects of the present disclosure.

One example of the computer system 314 is shown in FIG. 4. As shown, the computer system 314 includes a processor 402 communicatively coupled to a bus. The processor 402 and memory 404 can be integrated into a single housing or can be distributed from one another.

The processor 402 can include one processing device or multiple processing devices. Examples of the processor 402 include a Field-Programmable Gate Array (FPGA), an application-specific integrated circuit (ASIC), and a microprocessor. The processor 402 can execute instructions 406 stored in the memory 404 to perform operations. The instructions 406 may include processor-specific instructions generated by a compiler or an interpreter from code written in any suitable computer-programming language, such as C, C++, C #, and Java. In some examples, the instructions 406 can be configured to perform some or all of the steps described above with respect to FIG. 1.

The memory 404 can include one memory device or multiple memory devices. The memory 404 can be volatile or non-volatile (e.g., it can retain stored information when powered off). Examples of the memory 404 include electrically erasable and programmable read-only memory (EEPROM), flash memory, or any other type of non-volatile memory. At least some of the memory 404 can include a non-transitory computer-readable medium from which the processor 402 can read instructions 406. A computer-readable medium can include electronic, optical, magnetic, or other storage devices capable of providing the processor 402 with computer-readable instructions or other program code. Examples of a computer-readable medium include magnetic disks, memory chips, ROM, random-access memory RAM, an ASIC, a configured processor, optical storage, or any other medium from which a computer processor can read the instructions 406.

In some examples, the processor 402 can execute the instructions 406 to perform operations. For example, the processor 402 can access a server stub 116 defining a server stub program 310. The server stub program 310 can be configured to operate as a remote procedure call (RPC) interface 408 for receiving a RPC request 412 from a client program 410. The RPC request 412 can include a data object 414 in a first format. The first format can correspond to a first RPC framework. The processor 402 can automatically generate translator code 120, defining a translation engine 312, based on the server stub 116. In some examples, the processor 402 can additionally or alternatively generate the translator code 120 based on a set of predefined rules 416. The predefined rules 416 may include, for example, any of the lookup tables or predefined logic described above. The translation engine 312 can be configured to convert the data object 414 from the first format received by the RPC interface 408 into a second format. The second format can be compatible with a server program 316, for example in that the second format corresponds to a second RPC framework that is different from the first RPC framework. The server program 316 is separate from the server stub program 310 and the translation engine 312.

Figure 5:
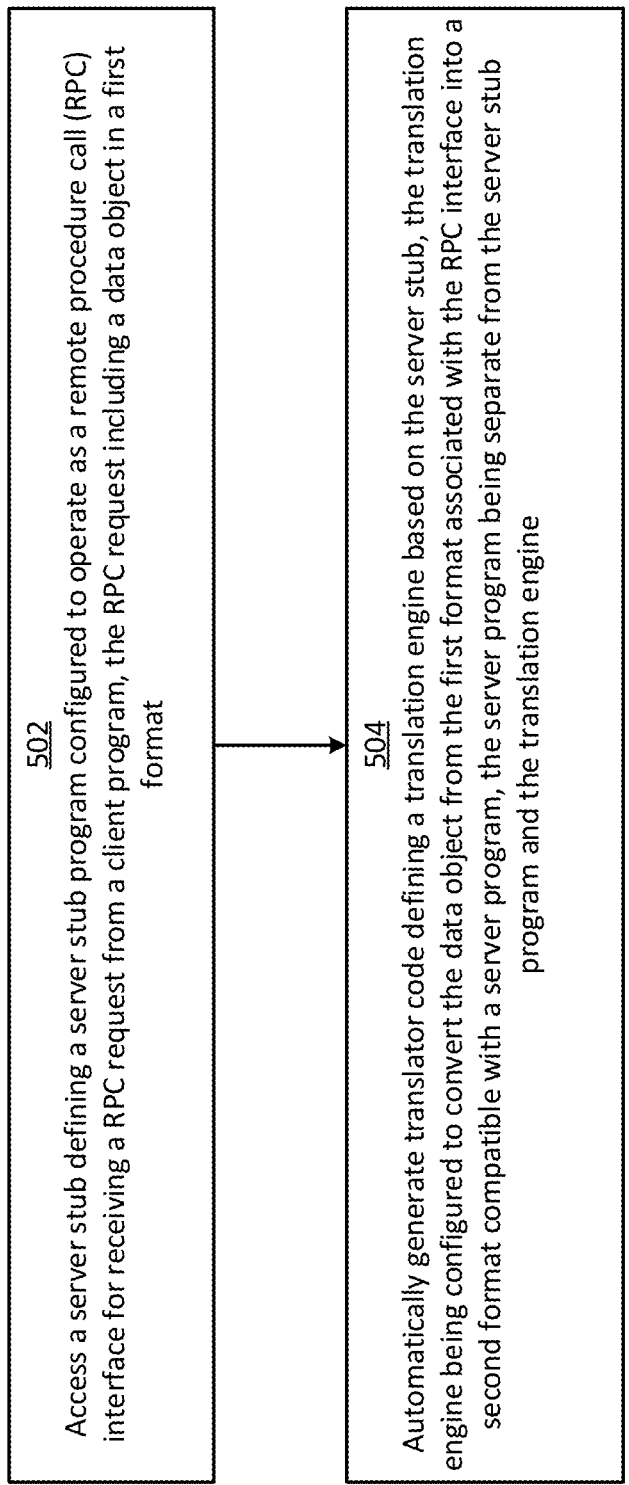
FIG. 5 shows a flow chart of an example of a process for generating translator code according to some aspects of the present disclosure.

FIG. 5 shows a flow chart of an example of a process for generating translator code according to some aspects of the present disclosure. Other examples may involve more operations, fewer operations, different operations, or a different order of operations than is shown in FIG. 5. The steps of FIG. 5 are described below with reference to the components of FIG. 4 above.

In block 502, the processor 402 accesses a server stub 116 defining a server stub program 310. For example, the processor 402 can generate the server stub 116. The processor 402 can generate the server stub 116 based on server program code 102, in some examples. Alternatively, the processor 402 can download the server stub 116 from a remote computing device. For instance, the processor 402 can obtain the server stub 116 from a repository, such as a Github repository. The server stub program 310 can be configured to operate as a remote procedure call (RPC) interface 408. The RPC interface 408 can be configured for receiving a RPC request 412 from a client program 410 and providing a corresponding RPC response back to the client program 410. The RPC request 412 can be in a first format. For example, the RPC request 412 can include a data object 414 in the first format. The RPC response may also be provided in the first format.

In block 504, the processor 402 automatically generates translator code 120 based on the server stub 116. The translator code 120 can define a translation engine 312. In some examples, the processor 402 may employ predefined rules 416 to generate the translator code 120, for example additionally or alternatively to analyzing the server stub 116. The predefined rules 416 may include the content of the lookup table 132 or predefined logic, described with respect to FIG. 1. The translation engine 312 can be configured to convert the data object 414 from the first format received by the RPC interface 408 into a second format compatible with a server program 316. The server program 316 is separate from the server stub program 310 and the translation engine 312.

In some examples, the translation engine 312 can also be configured to convert the RPC results received from the server program 316 from the second format into the first format. The first format may be compatible with the client program 410 and the second format may be incompatible with the client program 410. For example, the second format may produce an error or other undesirable result in the client program 410. This translation may avoid such errors.

In some aspects, a translation engine for facilitating remote procedure calls between a client program and a server program can be automatically generated according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by one or more processors for causing the one or more processors to: access a server stub defining a server stub program configured to operate as a remote procedure call (RPC) interface for receiving a RPC request from a client program, the RPC request including a data object in a first format; and generate translator code defining a translation engine based on the server stub, the translation engine being configured to convert the data object from the first format associated with the RPC interface into a second format compatible with a server program, the server program being separate from the server stub program and the translation engine.

Example #2: The non-transitory computer-readable medium of Example #1, further comprising program code that is executable by the one or more processors for causing the one or more processors to: generate the server stub based on an interface definition associated with the server program, the interface definition being written in an interface definition language (IDL).

Example #3: The non-transitory computer-readable medium of Example #2, further comprising program code that is executable by the one or more processors for causing the one or more processors to: generate the interface definition based on source code for the server program.

Example #4: The non-transitory computer-readable medium of Example #3, wherein the source code of the server program is drafted in a programming language that is different from the interface definition language, and further comprising program code that is executable by the one or more processors for causing the one or more processors to generate the server stub in the programming language.

Example #5: The non-transitory computer-readable medium of any of Examples #1-2, further comprising program code that is executable by the one or more processors for causing the one or more processors to: generate a modified server stub by modifying the server stub to include at least one reference to the translation engine.

Example #6: The non-transitory computer-readable medium of Example #5, further comprising program code that is executable by the one or more processors for causing the one or more processors to: determine a parameter by analyzing comment data in the interface definition; determine a code segment based on the parameter; and generate the modified server stub by incorporating the code segment into the server stub.

Example #7: The non-transitory computer-readable medium of any of Examples #5-6, further comprising program code that is executable by the one or more processors for causing the one or more processors to: generate an archive file based on the modified server stub and the translator code, the archive file being configured to deploy the server stub program and the translation engine in a computing environment.

Example #8: The non-transitory computer-readable medium of Example #7, further comprising program code that is executable by the one or more processors for causing the one or more processors to: deploy the server stub program and the translation engine in the computing environment using the archive file.

Example #9: A method comprising: accessing, by one or more processors, a server stub defining a server stub program configured to operate as a remote procedure call (RPC) interface for receiving a RPC request from a client program, the RPC request including a data object in a first format; and generating, by the one or more processors, translator code defining a translation engine based on the server stub, the translation engine being configured to convert the data object from the first format associated with the RPC interface into a second format compatible with a server program, the server program being separate from the server stub program and the translation engine.

Example #10: The method of Example #9, further comprising generating the server stub based on an interface definition associated with the server program, the interface definition being written in an interface definition language (IDL).

Example #11: The method of Example #10, further comprising generating the interface definition based on source code for the server program.

Example #12: The method of Example #11, wherein the source code of the server program is drafted in a programming language that is different from the interface definition language, and further comprising generating the server stub in the programming language.

Example #13: The method of any of Examples #9-10, further comprising generating a modified server stub by modifying the server stub to include at least one reference to the translation engine.

Example #14: The method of Example #13, further comprising: determining a parameter by analyzing comment data in the interface definition; determining a code segment based on the parameter; and generating the modified server stub by incorporating the code segment into the server stub.

Example #15: The method of Example #13, further comprising generating an archive file based on the modified server stub and the translator code, the archive file being configured to deploy the server stub program and the translation engine in a computing environment.

Example #16: The method of Example #15, further comprising deploying the server stub program and the translation engine in the computing environment using the archive file.

Example #17: A system comprising: one or more processors; and one or more memories including instructions that are executable by the one or more processors for causing the one or more processors to: access a server stub defining a server stub program configured to operate as a remote procedure call (RPC) interface for receiving a RPC request from a client program, the RPC request including a data object in a first format; and generate translator code defining a translation engine based on the server stub, the translation engine being configured to convert the data object from the first format associated with the RPC interface into a second format compatible with a server program, the server program being separate from the server stub program and the translation engine.

Example #18: The system of Example #17, wherein the one or more memories further include instructions that are executable by the one or more processors for causing the one or more processors to: generate an interface definition based on source code for the server program, the interface definition being written in an interface definition language (IDL), and the source code being written in a programming language that is different from the IDL; generate the server stub based on the interface definition associated with the server program; and generate a modified server stub by modifying the server stub to include at least one reference to the translation engine.

Example #19: The system of Example #18, wherein the one or more memories further include instructions that are executable by the one or more processors for causing the one or more processors to: determine a parameter by analyzing comment data in the interface definition; determine a code segment based on the parameter; and generate the modified server stub by incorporating the code segment into the server stub.

Example #20: The system of any of Examples #18-19, wherein the one or more memories further include instructions that are executable by the one or more processors for causing the one or more processors to: generate an archive file based on the modified server stub and the translator code, the archive file being configured to deploy the server stub program and the translation engine in a computing environment; and deploy the server stub program and the translation engine in the computing environment using the archive file.

Example #21: A non-transitory computer-readable medium comprising program code that is executable be one or more processors for causing the one or more processors to: generate an interface definition based on source code for a server program, the interface definition being written in an interface definition language (IDL), and the source code being written in a programming language that is different from the IDL; generate a server stub based on the interface definition associated with the server program, the server stub defining a server stub program configured to operate as a remote procedure call (RPC) interface for receiving a RPC request from a client program, the RPC request including a data object in a first format; generate translator code defining a translation engine based on the server stub, the translation engine being configured to convert the data object from the first format associated with the RPC interface into a second format compatible with the server program, the server program being separate from the server stub program and the translation engine; and generate a modified server stub by modifying the server stub to include at least one reference to the translation engine.

Example #22: The non-transitory computer-readable medium of Example #21, further comprising program code that is executable be one or more processors for causing the one or more processors to: determine a parameter by analyzing comment data in the interface definition; determine a code segment based on the parameter; and generate the modified server stub by incorporating the code segment into the server stub.

Example #23: The non-transitory computer-readable medium of any of Examples #21-22, further comprising program code that is executable be one or more processors for causing the one or more processors to: generate an archive file based on the modified server stub and the translator code, the archive file being configured to deploy the server stub program and the translation engine in a computing environment; and deploy the server stub program and the translation engine in the computing environment using the archive file.

Example #24: A method comprising: generating, by one or more processors, an interface definition based on source code for a server program, the interface definition being written in an interface definition language (IDL), and the source code being written in a programming language that is different from the IDL; generating, by the one or more processors, a server stub based on the interface definition associated with the server program, the server stub defining a server stub program configured to operate as a remote procedure call (RPC) interface for receiving a RPC request from a client program, the RPC request including a data object in a first format; generating, by the one or more processors, translator code defining a translation engine based on the server stub, the translation engine being configured to convert the data object from the first format associated with the RPC interface into a second format compatible with the server program, the server program being separate from the server stub program and the translation engine; and generating, by the one or more processors, a modified server stub by modifying the server stub to include at least one reference to the translation engine.

Example #25: The method of Example #24, further comprising: determining a parameter by analyzing comment data in the interface definition; determining a code segment based on the parameter; and generating the modified server stub by incorporating the code segment into the server stub.

Example #26: The method of any of Examples #24-25, further comprising: generating an archive file based on the modified server stub and the translator code, the archive file being configured to deploy the server stub program and the translation engine in a computing environment; and deploying the server stub program and the translation engine in the computing environment using the archive file.

Example #27: A system comprising: one or more processors; and one or more memories including instructions that are executable by the one or more processors for causing the one or more processors to: receive a remote procedure call (RPC) request from a client program at a server stub program, the RPC request including a data object in a first format; provide the data object in the first format to a translation engine that is separate from the server stub program, the translation engine being configured to convert the data object from the first format to a second format that is different from the first format; provide the data object in the second format from the translation engine to a server program that is separate from the translation engine, the server program being configured to generate a RPC result in the second format based on the data object; receive the RPC result from the server program at the translation engine; convert the RPC result from the second format to the first format at the translation engine; and provide the RPC result in the first format from the translation engine to the server stub program, the server stub program being configured to transmit the RPC result in the first format to the client program.

Example #28: The system of Example #27, wherein the first format is compatible with the client program and incompatible with the server program, and wherein the second format is compatible with the server program and incompatible with the client program.

Example #29: The system of any of Examples #27-28, wherein the one or more memories further include instructions that are executable by the one or more processors for causing the one or more processors to deploy the server stub program, the translation engine, and the server program in a computing environment that is remote from the client program.

Example #30: The system of any of Examples #27-29, wherein the one or more memories further include instructions that are executable by the one or more processors for causing the one or more processors to deploy the server stub program, the translation engine, and the server program from an archive file.

Example #31: A method comprising: receiving, by one or more processors, a remote procedure call (RPC) request from a client program at a server stub program, the RPC request including a data object in a first format; providing, by the one or more processors, the data object in the first format to a translation engine that is separate from the server stub program, the translation engine being configured to convert the data object from the first format to a second format that is different from the first format; providing, by the one or more processors, the data object in the second format from the translation engine to a server program that is separate from the translation engine, the server program being configured to generate a RPC result in the second format based on the data object; receiving, by the one or more processors, the RPC result from the server program at the translation engine; converting, by the one or more processors, the RPC result from the second format to the first format at the translation engine; and providing, by the one or more processors, the RPC result in the first format from the translation engine to the server stub program, the server stub program being configured to transmit the RPC result in the first format to the client program.

Example #32: The method of Example #31, wherein the first format is compatible with the client program and incompatible with the server program, and wherein the second format is compatible with the server program and incompatible with the client program.

Example #33: The method of any of Examples #31-32, further comprising deploying the server stub program, the translation engine, and the server program in a computing environment that is remote from the client program.

Example #34: The method of any of Examples #31-33, further comprising deploying the server stub program, the translation engine, and the server program from an archive file.

Example #35: A system comprising: means for accessing a server stub defining a server stub program configured to operate as a remote procedure call (RPC) interface for receiving a RPC request from a client program, the RPC request including a data object in a first format; and means for generating translator code defining a translation engine based on the server stub, the translation engine being configured to convert the data object from the first format associated with the RPC interface into a second format compatible with a server program, the server program being separate from the server stub program and the translation engine.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A non-transitory computer-readable medium comprising program code that is executable by one or more processors for causing the one or more processors to:
   access a server stub defining a server stub program configured to operate as a remote procedure call (RPC) interface for receiving a RPC request from a client program, the RPC request including a data object in a first format;
   generate translator code defining a translation engine based on the server stub, the translation engine being configured to convert the data object from the first format associated with the RPC interface into a second format compatible with a server program, the server program being separate from the server stub program and the translation engine; and
   generate a modified server stub by modifying the server stub to include at least one reference to the translation engine.

2. The non-transitory computer-readable medium of claim 1, further comprising program code that is executable by the one or more processors for causing the one or more processors to:
   generate the server stub based on an interface definition associated with the server program, the interface definition being written in an interface definition language (IDL).

3. The non-transitory computer-readable medium of claim 2, further comprising program code that is executable by the one or more processors for causing the one or more processors to:
   generate the interface definition based on source code for the server program.

4. The non-transitory computer-readable medium of claim 3, wherein the source code of the server program is drafted in a programming language that is different from the interface definition language, and further comprising program code that is executable by the one or more processors for causing the one or more processors to generate the server stub in the programming language.

5. The non-transitory computer-readable medium of claim 2, further comprising program code that is executable by the one or more processors for causing the one or more processors to:
   determine a parameter by analyzing comment data in the interface definition;
   determine a code segment based on the parameter; and
   generate the modified server stub by incorporating the code segment into the server stub.

6. The non-transitory computer-readable medium of claim 1, further comprising program code that is executable by the one or more processors for causing the one or more processors to:
   generate an archive file based on the modified server stub and the translator code, the archive file being configured to deploy the server stub program and the translation engine in a computing environment.

7. The non-transitory computer-readable medium of claim 6, further comprising program code that is executable by the one or more processors for causing the one or more processors to:
   deploy the server stub program and the translation engine in the computing environment using the archive file.

8. A method comprising:
   accessing, by one or more processors, a server stub defining a server stub program configured to operate as a remote procedure call (RPC) interface for receiving a RPC request from a client program, the RPC request including a data object in a first format;
   generating, by the one or more processors, translator code defining a translation engine based on the server stub, the translation engine being configured to convert the data object from the first format associated with the RPC interface into a second format compatible with a server program, the server program being separate from the server stub program and the translation engine; and
   generating, by the one or more processors, a modified server stub by modifying the server stub to include at least one reference to the translation engine.

9. The method of claim 8, further comprising generating the server stub based on an interface definition associated with the server program, the interface definition being written in an interface definition language (IDL).

10. The method of claim 9, further comprising generating the interface definition based on source code for the server program.

11. The method of claim 10, wherein the source code of the server program is drafted in a programming language that is different from the interface definition language, and further comprising generating the server stub in the programming language.

12. The method of claim 9, further comprising:
   determining a parameter by analyzing comment data in the interface definition;
   determining a code segment based on the parameter; and
   generating the modified server stub by incorporating the code segment into the server stub.

13. The method of claim 8, further comprising generating an archive file based on the modified server stub and the translator code, the archive file being configured to deploy the server stub program and the translation engine in a computing environment.

14. The method of claim 13, further comprising deploying the server stub program and the translation engine in the computing environment using the archive file.

15. A system comprising:
   one or more processors; and
   one or more memories including instructions that are executable by the one or more processors for causing the one or more processors to:
     access a server stub defining a server stub program configured to operate as a remote procedure call (RPC) interface for receiving a RPC request from a client program, the RPC request including a data object in a first format;
     generate translator code defining a translation engine based on the server stub, the translation engine being configured to convert the data object from the first format associated with the RPC interface into a second format compatible with a server program, the server program being separate from the server stub program and the translation engine; and
     generate a modified server stub by modifying the server stub to include at least one reference to the translation engine.

16. The system of claim 15, wherein the one or more memories further include instructions that are executable by the one or more processors for causing the one or more processors to:
   generate an interface definition based on source code for the server program, the interface definition being written in an interface definition language (IDL), and the source code being written in a programming language that is different from the IDL; and
   generate the server stub based on the interface definition associated with the server program.

17. The system of claim 16, wherein the one or more memories further include instructions that are executable by the one or more processors for causing the one or more processors to:
   determine a parameter by analyzing comment data in the interface definition;
   determine a code segment based on the parameter; and
   generate the modified server stub by incorporating the code segment into the server stub.

18. The system of claim 15, wherein the one or more memories further include instructions that are executable by the one or more processors for causing the one or more processors to:
   generate an archive file based on the modified server stub and the translator code, the archive file being configured to deploy the server stub program and the translation engine in a computing environment; and deploy the server stub program and the translation engine in the computing environment using the archive file.

\* \* \* \* \*